(12) United States Patent
Sekiguchi et al.

(10) Patent No.: US 7,557,773 B2
(45) Date of Patent: Jul. 7, 2009

(54) VARIABLE TUNING ANTENNA AND MOBILE WIRELESS DEVICE USING SAME

(75) Inventors: Fusao Sekiguchi, Tokyo (JP); Kenichi Mitsugi, Tokyo (JP)

(73) Assignee: Yokowo Co., Ltd., Tokyo (JP)

( * ) Notice: Subject to any disclaimer, the term of this patent is extended or adjusted under 35 U.S.C. 154(b) by 4 days.

(21) Appl. No.: 10/553,750

(22) PCT Filed: Apr. 16, 2004

(86) PCT No.: PCT/JP2004/005502

§ 371 (c)(1),
(2), (4) Date: Oct. 18, 2005

(87) PCT Pub. No.: WO2004/093334

PCT Pub. Date: Oct. 28, 2004

(65) Prior Publication Data

US 2006/0197711 A1    Sep. 7, 2006

(30) Foreign Application Priority Data

Apr. 18, 2003  (JP) .............................. 2003-114138

(51) Int. Cl.
  *H01Q 1/10* (2006.01)
  *H01Q 9/00* (2006.01)
  *H01Q 1/24* (2006.01)
(52) U.S. Cl. .................. 343/901; 343/745; 343/889; 343/702
(58) Field of Classification Search ............... 343/702, 343/745, 895, 888, 889, 900, 901
See application file for complete search history.

(56) References Cited

U.S. PATENT DOCUMENTS 3,474,453 A * 10/1969 Ireland ........................ 343/745

(Continued)

FOREIGN PATENT DOCUMENTS

EP    0 021 762 A1    1/1981

(Continued)

OTHER PUBLICATIONS

Microfilm of the specification and drawings annexed to the request of Japanese Utility Model Application No. 161209/1981 (Laid-open No. 66722/1983) (Pioneer Electronic Corp.), May 6, 1983, Full text; all drawings (Family: none).
International Search Report mailed on Aug. 10, 2004.
Supplementary European Search Report, Ref. EP46272 (App# 04728058.1), Dec. 14, 2006 (3 pages).

*Primary Examiner*—Hoang V Nguyen
*Assistant Examiner*—Robert Karacsony
(74) *Attorney, Agent, or Firm*—Rabin & Berdo, PC.

(57) ABSTRACT

A variable tuning antenna includes a tuning circuit (1) and a radiation element (2), connected to each other in series. The tuning circuit (1) includes a first inductance element (11) and a parallel circuit (12) to each other in series, and the parallel circuit (12) includes a second inductance element (121) and a variable capacitance element (122) to each other in parallel. And the tuning circuit is set so that the combined reactance of the radiation element and the first inductance element and the combined reactance of the parallel circuit can be canceled by each other, and the parallel circuit does not resonate in a desired receiving frequency band, and moreover, the tuning circuit is formed so as to be tunable in the desired frequency band by varying the capacitance of the variable capacitance. As a result, the variable tuning antenna can be obtained which is applicable to, for example, a portable telephone and is tunable in a whole range of a wide range of a low frequency band such as that of a digital TV. And a portable wireless device using the antenna is also obtained.

6 Claims, 4 Drawing Sheets

U.S. PATENT DOCUMENTS

| | | | | |
|---|---|---|---|---|
| 4,381,566 | A | * | 4/1983 | Kane .................. 455/193.3 |
| 5,446,469 | A | * | 8/1995 | Makino ................ 343/702 |
| 5,861,859 | A | * | 1/1999 | Kanayama et al. ......... 343/895 |
| 6,229,489 | B1 | * | 5/2001 | Holshouser et al. ........ 343/702 |
| 6,433,749 | B1 | * | 8/2002 | Thompson .............. 343/713 |
| 7,132,998 | B2 | * | 11/2006 | Ryou et al. ............. 343/895 |

FOREIGN PATENT DOCUMENTS

| | | | |
|---|---|---|---|
| JP | 56-000713 A | | 1/1981 |
| JP | 58-66722 U | | 5/1983 |
| JP | 59-126327 A | | 7/1984 |
| JP | 04-082409 | | 3/1992 |
| JP | 06-216630 A | | 8/1994 |
| JP | 6-314982 A | | 11/1994 |
| JP | 08-222926 A | | 8/1996 |
| JP | 09-074304 A | | 3/1997 |
| JP | 09-130132 | | 5/1997 |
| JP | 10-209897 A | | 8/1998 |
| JP | 10209897 A | * | 8/1998 |
| JP | 2000-223920 A | | 8/2000 |
| JP | 2002-232323 A | | 8/2002 |
| JP | 2002-271281 A | | 9/2002 |
| JP | 2003-046315 | | 2/2003 |
| JP | 2003-101812 A | | 4/2003 |

* cited by examiner

VARIABLE TUNING ANTENNA AND MOBILE WIRELESS DEVICE USING SAME

FIELD OF THE INVENTION

The present invention relates to a variable tuning antenna of a simple structure for use in a portable wireless device such as a portable telephone and a portable terminal, which can receive wide band radio waves such as that used in a digital television, and to a portable wireless device using the antenna. More particularly, the present invention relates to a variable tuning antenna which is tunable in a frequency range above 300 MHz of a digital television band (from 470 to 770 MHz) by using conventional variable capacitance elements, and to a portable wireless device using the antenna.

BACKGROUND OF THE INVENTION

A service of a digital television broadcast is promoted lately and it is expected to receive it by a portable telephone or a portable terminal device. And in the field of portable terminal devices, a diversification of devices has been attempted by providing a function for receiving frequency bands of various fields such as not only those of a cellular communication, but also those of a GPS (a global positioning system; 1.5 GHz band), and a Bluetooth (2.45 GHz band). Therefore, an antenna for such a portable wireless device is also expected to have a simple structure and operate in more multiple and wider frequency bands.

As conventional variable tuning antennas of a simple structure operating in a wide band, an antenna shown in FIG. 6A is known (for example, cf. Japanese Patent Application Laid-Open No. 2002-232313 (FIG. 1)). In this antenna, a variable capacitance element 52 is connected between a base terminal part of a radiation element 51 such as a monopole type or a helical type and a feeding part, and by utilizing a series resonance of a capacitance of the variable capacitance element 52 and an inductance of a radiation element 51, a tuning frequency is varied by varying the capacitance of the variable capacitance element 52 with voltage applied to it. Further, an antenna shown in FIG. 6B is known (for example, cf. Japanese Patent Application Laid-Open No. HEI10-209897 (FIG. 1)). In this antenna, a fixed inductance element 53 and a variable capacitance element 52 are connected to a radiation element 51 in series and the series resonance frequency is varied by varying the capacitance of the variable capacitance element 52.

Resonance frequencies (angular frequency ω) in the structures shown in FIG. 6A and in FIG. 6B described above are represented as following equations (1) and (2) respectively. In other words, as the radiation element 51 is inductive and its capacitance is very small, taking La for the inductance of the radiation element 51, C for the capacitance of the variable capacitance element 52 and L for the inductance of the fixed inductance element 53, two equations are represented as follows.

$$\omega = 1/(L_a \cdot C)^{1/2} \quad (1)$$

$$\omega = 1/\{(L_a+L) \cdot C\}^{1/2} \quad (2)$$

In equation (1), as La, an inductance of a radiation element, is nearly constant in most structures of radiation elements,. ω (a resonance angular frequency) varies linearly according to $C^{1/2}$ with a variation of a capacitance of a variable capacitance element. But, in general, because variable capacitance elements currently available have a limitation in a range of a variation of their capacitance such that the maximum amount of the variation is only up to about 150 MHz, for example, in a low frequency like that of a digital TV band (470-770 MHz), problems may arise that tuning in whole frequency band $(f_L$-$f_H)$ of digital TV cannot be achieved and that a characteristics of VSWR and an antenna gain deteriorate in the certain frequency bands, as explained in FIG. 7 where an example of the relationship between the VSWR and the gain to a frequency is shown in case of varying a capacitance of a variable capacitance element.

On the other hand, in a case of a structure shown in FIG. 6B, it is obvious from equation (2) that the resonance frequency ω is $(L_a+L)^{-1/2}/L_a^{-1/2}$ times, that is $\{L_a/(L_a+L)\}^{1/2}$ times to that given by equation (1), assuming that the C of a variable capacitance element is the same in these equations, and that as L is positive, the coefficient described above is always smaller than 1, and that the amount of the variation of the resonance frequency is smaller than that shown in equation (1) with the same amount of the variation of the capacitance C. Although, there are cases that the amount of the variation of a resonance frequency in the structure shown in FIG. 6B becomes greater due to the stray capacitance formed between an antenna element or a tuning circuit and the ground in a practical case, but it does not make big difference.

DISCLOSURE OF THE INVENTION

The present invention is directed to solve the above-described problems and an object of the invention is to provide a variable tuning antenna which can be mounted in a small portable wireless device such as a portable telephone, and tunable in a low frequency band such as that of a digital TV band and also in whole range of a wide band (for example, above ±20% to a center frequency).

Another object of the present invention is to provide a variable tuning antenna capable of being mounted, for example, in a portable telephone or the like, and also of receiving or transmitting two different frequency bands or more in cellular bands in addition to the above low frequency band.

A still another object of the invention is to provide a portable wireless device which can transmit and receive more than two frequency bands such as in receiving of digital TV and transmitting/receiving of cellular communication, and additionally GPS band or the Bluetooth band by a portable telephone.

A variable tuning antenna according to the present invention includes, a radiation element and a tuning circuit, connected to each other in series, and the tuning circuit including a first inductance element and a parallel circuit to each other in series, and the parallel circuit including a second inductance element and a variable capacitance element to each other in parallel, wherein the tuning circuit is set so that the combined reactance of the radiation element and the first inductance element and the combined reactance of the parallel circuit can be canceled by each other and the parallel circuit does not resonate in a desired receiving frequency band, and wherein the tuning circuit is formed so as to be tunable in the desired frequency band by varying the capacitance of the variable capacitance element.

With such structure, because the combined reactance of the radiation element and the first inductance element and the combined reactance of the parallel circuit are cancelled each other, and, further, the radiation element is substantially inductive and its capacitance is very small, these serve as a series resonance circuit and the resonance frequency ω (a resonance angular frequency) is represented by a following equation (3).

$$\omega = \sqrt{\frac{L_a + L_1 + L_2}{L_2(L_a + L_1) \cdot C}} \qquad (3)$$

Here, La represents the inductance of the radiation element, C the capacitance of the variable capacitance element, $L_1$ the inductance of the first inductance element and $L_2$ the inductance of the second inductance element.

Comparing this equation (3) to equation (1) described above, while contribution of the capacitance C of the variable capacitance element is common, it is found that the resonance frequency ω is $\{(L_a+L_1+L_2)/L_2(L_a+L_1)\}^{-1/2}/L_a^{-1/2}$ times and this value can be grater than 1 by choosing values of $L_1$ and $L_2$. Then, for a variable capacitance element with the same variation of the capacitance (electrostatic capacitance), a resonance frequency can be varied more widely by this times. As a result, for example, in the frequency band of the digital TV described above, a variation of the frequency band over 300 MHz can be obtained by using variable capacitance diodes.

Here a structure is very preferable in which the variable capacitance element includes two variable capacitance diodes reversely connected together in series and a control voltage terminal is located at a connecting point of the two variable capacitance diodes. In this structure, a same variation of the capacitance can be achieved with a lower voltage and a higher variation rate over two times, because the combined capacitance becomes half compared to that in case of one diode, and therefore a precise adjustment can be obtained.

It is preferably that the radiation element includes a first antenna element and a second antenna element connected to each other electrically in series, the first antenna element and the second antenna element being formed in an electric length so as to resonate at a frequency within the desired frequency band by the total length, thereby resonating at a first frequency band of a wide band in the desired frequency band with the tuning circuit, and resonating at a second frequency band by only the first antenna element. By making this structure, the antenna operating for two radio waves can be achieved, such as for the first frequency utilizing the whole of the radiation element by pulling the second antenna element out of the casing, and for the second frequency band utilizing only the first antenna element by putting the second antenna element in the casing. The resonance by the whole of the first antenna element and the second antenna element is usually set in a length of about ¼λ of the wave length at a center frequency of the frequency band or its odd multiples.

In case that the first frequency band is a frequency band for a digital TV, the digital TV can be observed by a portable wireless device like a portable telephone.

A portable wireless device according to the present invention includes; a transmitting/receiving circuit, a casing surrounding the transmitting/receiving circuit, a feeding part located near to the casing and connected to the transmitting/receiving circuit electrically, a variable tuning antenna including a tuning circuit and a radiation element which are connected to the feeding part, and a third antenna element connected to the feeding part, wherein the variable tuning antenna comprises any one of the antenna defined in claims 1 to 4, and the third antenna element comprises an antenna resonating at a third frequency band different from that of the variable tuning antenna, so that two frequency bands of a first frequency band of a wide band obtained by the variable tuning antenna and the third frequency band can be transmitted and received. As a result, a digital TV can be observed by a portable telephone while calling, for example, by setting a digital TV band to the first frequency band and a portable telephone band to the third frequency band.

It is preferably that the radiation element includes a first antenna element and a second antenna element connected to each other electrically in series, and the second antenna element of the radiation element is formed movable to be extended out of the casing and settled into the casing, and wherein when the second antenna element is extended out of the casing, the second antenna element is connected to the feeding part through the tuning circuit of the variable tuning antenna to resonate at the first frequency band and when the first antenna element is settled into the casing, the first antenna element is connected to the feeding part directly. By making this structure, when the first frequency band is not received, the portable wireless device can be used, for example, for a cellular communication, GPS and the Bluetooth by the first antenna element.

It is preferable that the first antenna element and the third antenna element are formed in an electrical length so as to resonate at the same frequency band and the phases of two are adjusted so that radio waves transmitted and received by the first antenna element and the third antenna element strengthen each other. By making this structure, when a portable telephone is used for a cellular communication and a digital TV, for example, a cellular communication can be transmitted and received with an increased sensitivity by switching off a digital TV.

THE BEST EMBODIMENT OF THE PRESENT INVENTION

A description will be given below of an antenna and a portable wireless device of using the antenna according to the present invention in reference to the drawings.

Figure 1:
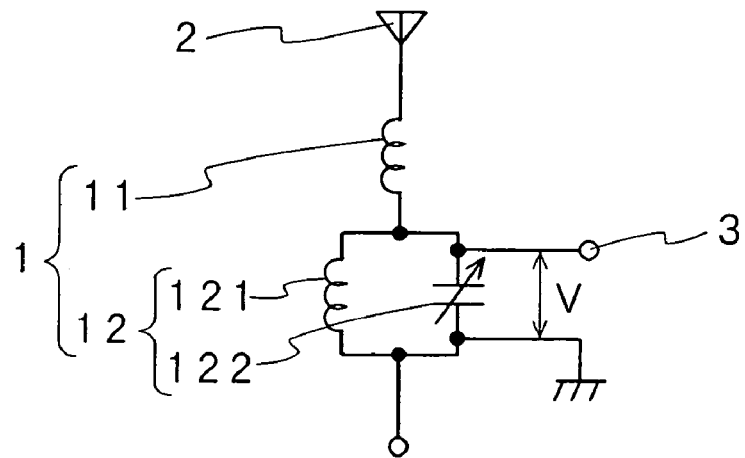
FIG. 1 is a figure of an equivalent circuit explaining a fundamental structure of a variable tuning antenna according to the present invention.

As shown in FIG. 1 illustrating a fundamental composition circuit of one embodiment, a variable tuning antenna according to the present invention includes a radiation element 2 (inductance $L_a$) and a tuning circuit 1 connected to the radiation element 2 in series.

The tuning circuit 1 includes a first inductance element 11 (inductance $L_1$) and a parallel circuit 12 connected each other in series, and the parallel circuit 12 includes a second inductance element 121 (inductance $L_2$) and a variable capacitance element 122 (capacitance C) connected each other in parallel. And the tuning circuit 1 is set so that the combined reactance of the radiation element 2 and the first inductance element 11 and the combined reactance of the parallel circuit 12 can be canceled by each other and the parallel circuit 12 does not resonate in a desired receiving frequency band, and moreover, the tuning circuit is formed so as to be tunable in the desired frequency band with the accompanied radiation element 2 by varying the capacitance of the variable capacitance element 122.

Various kinds of radiation elements such as a helical type, a monopole type, a folded element type and a plane type formed on a ceramic substrate can be used for the radiation element 2.

As shown in FIG. 1, the tuning circuit 1 consists essentially of the first inductance element 11 and the parallel circuit 12 connected together in series. And the parallel circuit 12 consists essentially of the second inductance element 121 and the variable capacitance element 122 connected together in parallel, and a terminal 3 for applying a voltage V is set at the variable capacitance element 122.

Figure 6A:
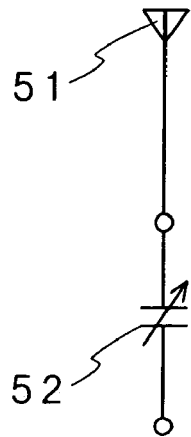
FIGS. 6A and 6B are figures explaining examples of embodiments of the conventional variable tuning antenna elements.

Conventional coils are used for the first inductance element 11 and the second inductance element 121, and, as described later, inductances of these elements 11, 121 are set so that a combined reactance of the radiation element 2 and the first inductance element 11 and a combined reactance of the parallel circuit 12 cancel each other and so that the parallel circuit 12 does not resonate in the desired frequency band. In this case, by setting $L_1$ and $L_2$ so that $\{(L_a+L_1+L_2)/L_2(L_a+L_1)\}^{1/2}/(1/L_a)^{1/2}$ is lager than 1, wider tuning range can be obtained with conventional variable capacitance elements in comparison with the conventional structure shown in FIG. 6A.

In other words, a resonance frequency (angular frequency $\omega=2\pi f$) of the parallel circuit 2 is given by an equation $$\omega = 1/(L_2 \cdot C)^{1/2} \quad (4),$$

and this resonance frequency is set to a frequency higher or lower than desired frequency band, for example, in a case of reception of a digital TV described above, a frequency higher or lower than the range from 470 MHz to 770 MHz. The reason is that, if the parallel circuit resonates, an impedance at a resonance frequency becomes infinite and a trap circuit is formed and therefore receiving at the frequency can not be obtained.

For example, a variable capacitance diode or a variable capacitor is used as the variable capacitance element 122 and an electronic variable capacitance element in which a capacitance can be varied by varying a voltage applied at both ends is preferable because of its small size and ease of varying a tuning frequency.

Next, a detailed description is given as to a reason why the variable tuning antenna according to the present invention can operate in a considerably wider frequency band even though using conventional variable capacitance elements. As explained above, because the tuning circuit 1 is set so that a combined reactance of the radiation element 2 and the first inductance element 11 and a combined reactance of the parallel circuit 12 cancel each other and the radiation element 2 is inductive and its capacitive component is very small, then the tuning circuit makes a series resonance at a frequency satisfying a following equation (5), where $L_a$ represents the inductance component of the radiation element 2, $L_1$ the inductance of the first inductance element, $L_2$ the inductance of the second inductance element and C the capacitance of the variable capacitance element.

$$\omega L_a + \omega L_1 + \frac{-\frac{\omega L_2}{\omega C}}{\omega L_2 - \frac{1}{\omega C}} = 0 \quad (5)$$

By arranging this equation (5) to get ω a resonance frequency represented in equation (3) can be obtained. Comparing this resonance frequency to that given by equation (1), of an antenna shown in FIG. 6A, as for a capacitance C, a contribution is same and $1/C^{1/2}$, and as for an inductance component, a contribution in equation (1) is $$\{1/L_a\}^{1/2} \quad (6),$$

on the other hand a contribution in equation(3) is $$\{(L_a+L_1+L_2)/L_2(L_a+L_1)\}^{1/2} \quad (7).$$

Figure 6B:
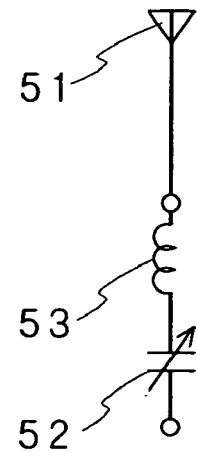

Therefore when the value of equation (7) is larger than that of equation (6), the variation of a resonance frequency can be larger than that of the antenna shown in FIG. 6 A for the variation of the same capacitance C.

Reversely explaining, because, the both inductances of the first inductance element 11 and the second inductance element 121 can be easily set with satisfying a condition of a resonance so that the value of equation (7) is lager than that of equation (6), a wider range of a variable frequency can be obtained comparing to that of an antenna of conventional structures. Especially an adjusting of a tuning range and a matching to the radiation element 2 can be easily achieved by adjusting the inductance $L_2$ of the second inductance element 121. For example, by setting $L_1$, $L_2$, and $L_a$ satisfying a equation $L_1=L_2=\frac{1}{2}\cdot L_a$, the ratio of the value of the equation (6) to that of (7) is equal to "1:$(8/3)^{1/2}$", then a resonance frequency of $(8/3)^{1/2}$ times can be varied with the variation of the same capacitance C. And in a structure shown in FIG. 6B, the ratio of the value of equation (1) to that of the equation (2) leads to "1:$(2/3)^{1/2}$". In other words, because of the setting to cancel the combined reactance described above each other, a variation range of a frequency can be increased with using the same variable capacitance C by setting $L_1$ and $L_2$ to such a value that the ratio of the value of equation (7) to that of equation (6), that is $\{(L_a+L_1+L_2)/L_2(L_a+L_1)\}^{1/2}/(1/L_a)^{1/2}$, may become lager than 1.

Figure 2A:
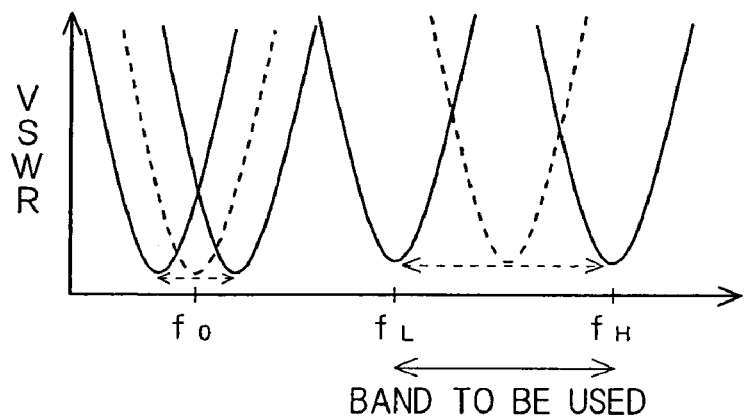
FIGS. 2A and 2B are graphs showing a VSWR and a gain to a frequency of the antenna shown in FIG. 1
Figure 2B:
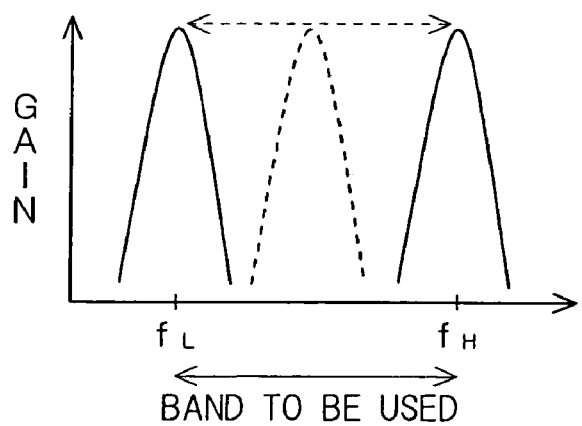
Figure 7A:
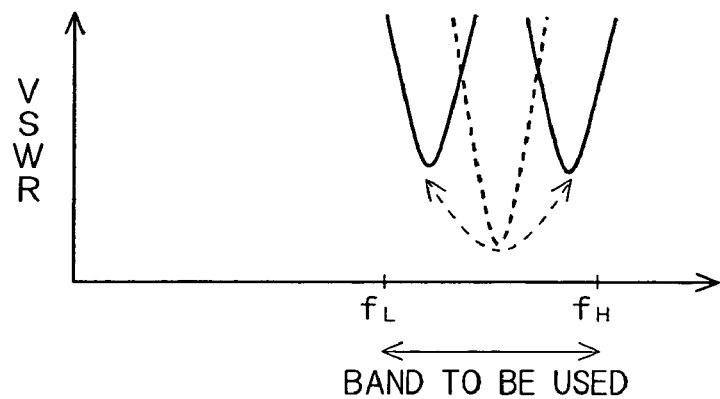
FIGS. 7A and 7B are graphs showing a band characteristics to a frequency in case of FIG. 6A.
Figure 7B:
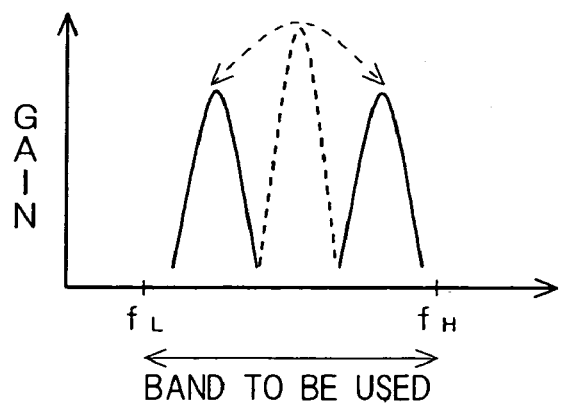

A characteristics of a VSWR and a gain are shown in FIGS. 2A and 2B, in the case where the radiation element 2 is formed, for the digital TV band, in an electrical length of an about ¼ wavelength of 620 MHz which is a center frequency of the digital TV band, the inductance of the first inductance element 11 is set to 47 nH, the inductance of the second inductance element 121 is set to 33 nH, and the variation range of the capacitance of the variable capacitance element 122 is set to from 2.5 pF to 15 pF. In FIGS. 2A and 2B, $f_L$ and $f_H$ represent $f_L$=470 MHz and $f_H$=770 MHz. It is obviously found in FIGS. 2A and 2B that a great improvement is achieved such that using the antenna according to the present invention can provide a small VSWR and a large gain compared to the characteristics shown in FIG. 7 described above. A band of a small VSWR in $f_0$ is found in FIG. 2A, but a gain is not shown in FIG. 2B, because the small VSWR is caused by a parallel resonance in the parallel circuit 2, in which a gain can not be obtained.

Figure 3:
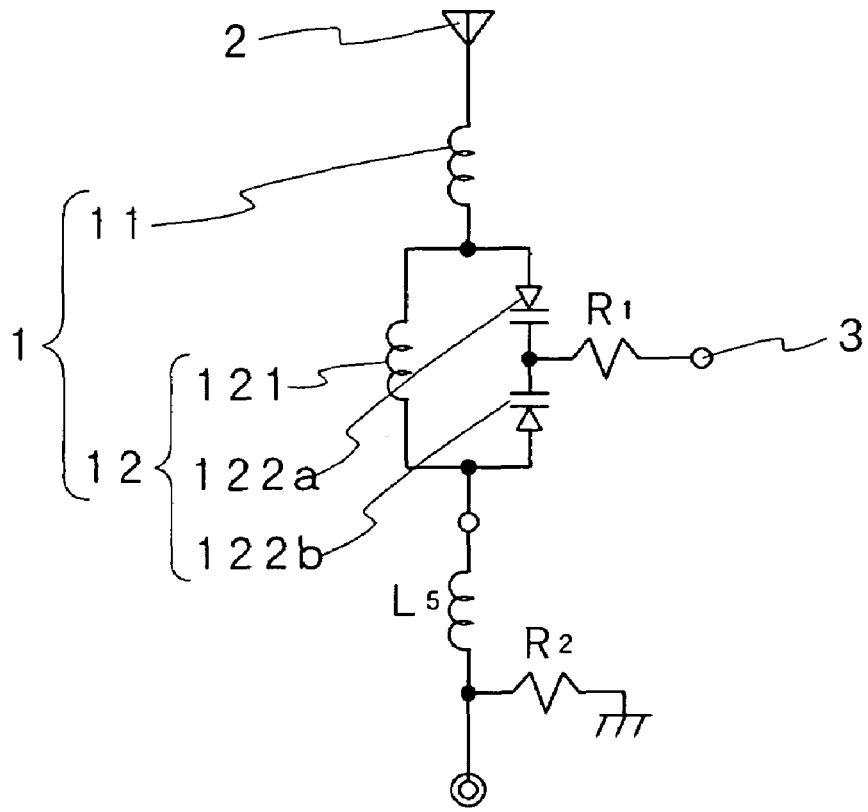
FIG. 3 is a figure of an equivalent circuit showing one example of the antenna shown in FIG. 1.

FIG. 3 is a figure of an equivalent circuit showing a more concrete embodiment of the antenna shown in FIG. 1. Here, in an example shown in FIG. 3, capacitance element 122 consists essentially of two variable capacitive diodes 122a and 122b connected together at their cathode ends in series, and a voltage feeding terminal 3 is provided on a connecting point of two diodes in order to apply a control voltage through a high resistance $R_1$ to reduce a high frequency effect. In place of the resistance $R_1$, an inductance element which has a high impedance at a high frequency may be used.

Figure 4:
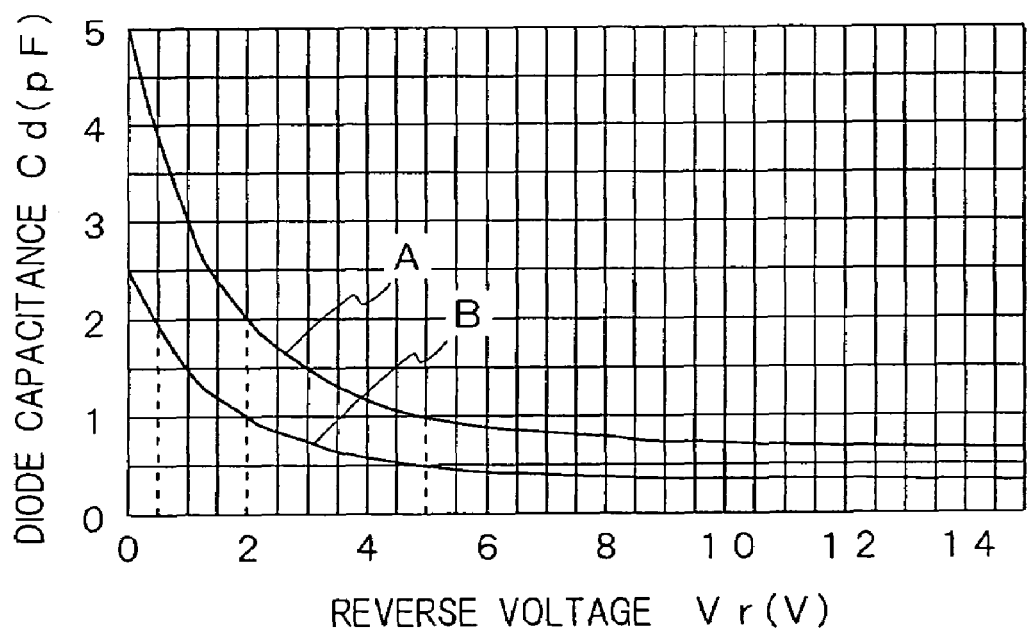
FIG. 4 is a graph showing a capacitance variation of the variable capacitance diode shown in FIG. 3 to a reverse voltage.

In this way, by connecting two variable capacitance elements in reveres polarity and in series, a same variation of a capacitance can be achieved by a lower voltage because the same voltage can be applied to two variable capacitance diodes and additionally a value of the capacitance can be ½ of each due to the series connection. For example, FIG. 4 shows variations of the diode capacitance $C_d$ to a voltage (reverse voltage) applied to one diode in the case A and to two diodes in series connected in the case B, respectively. From FIG. 4, it is necessary to change a voltage from 2 V to 5 V in order to vary a capacitance from 1 pF to 2 pF in the case A, while it is sufficient to change a voltage from 0.5 V to 2 V in order to get the same variation of capacitance in the case B. Generally, as variable capacitive diodes having a low capacitance and a large variation of capacitance are in limited availability, such a connection with two diodes is effective to get a small variation of a capacitance and to enable a control at a low voltage.

The electrostatic capacitance of this variable capacitive diode decreases with an increase of a control voltage and then a resonance frequency becomes higher. As a result, a tuning frequency can be adjusted high by increasing a control voltage and low by decreasing. In FIG. 3, the inductance element $L_5$ is an element for matching which eliminates mismatched condition between the antenna and the feeding circuit, thereby obtaining a high and stable gain. The inductance $L_5$ may also be provided in the matching circuit described later. Therefore, the inductance $L_5$ is very small and has less influence to canceling of the combined reactance of the resonance circuit 1 and that of the radiation element 2 and the first inductance element 11. And additionally, the resistance $R_2$, a high resistance over several kilo ohms having less influence at high frequency, is connected to the ground in order to flow a DC current of the variable capacitive diodes 122a and 122b to the ground. This resistance $R_2$ can also be replaced by an inductance element which has a high impedance at a high frequency.

As explained above, in the variable tuning antenna according to the present invention, a wide variation of a resonance frequency can be obtained to corresponding variation of a capacitance by the inductance of the parallel circuit, because the tuning circuit is set so that the combined reactance of the radiation element and the first inductance element and that of the parallel circuit are canceled each other. As a result, a wide band tuning above 300 MHz is possible even at a low frequency like that of a digital TV and therefore the digital TV can be observed while communicating on a portable telephone, by applying this antenna to a portable wireless devices such as a portable telephone.

Figure 5A:
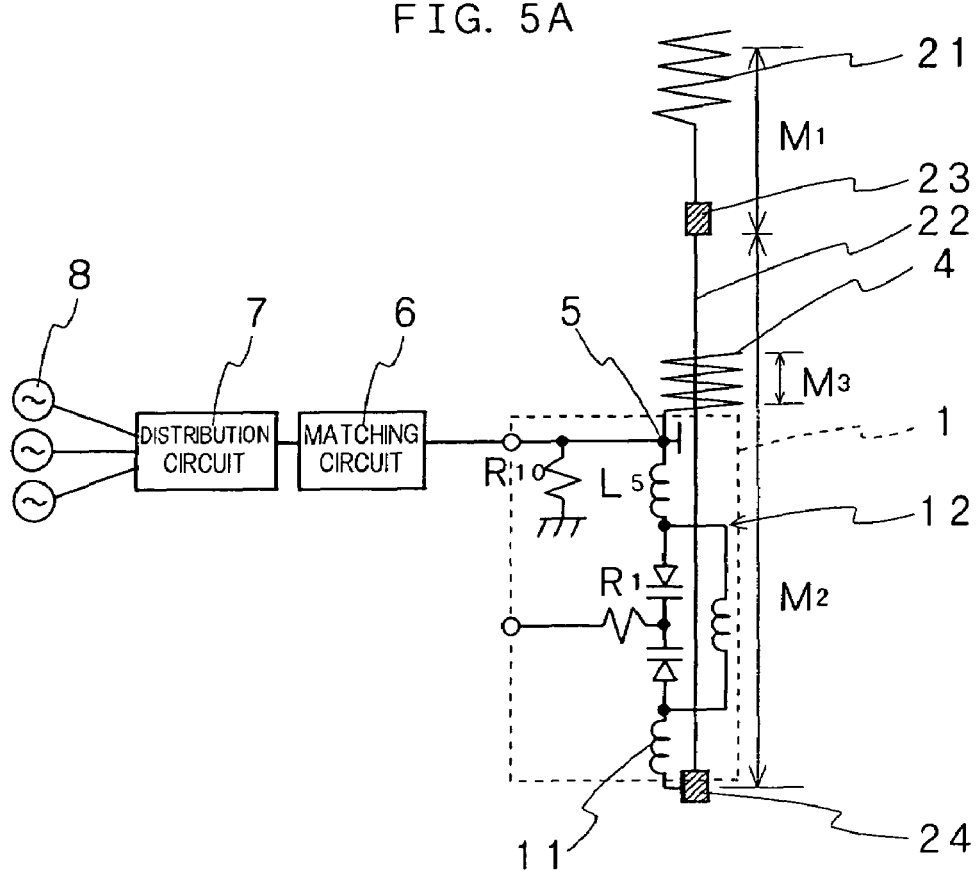
FIGS. 5A and 5B are figures explaining a part of an antenna in a portable wireless device using the antenna shown in FIG. 3.
Figure 5B:
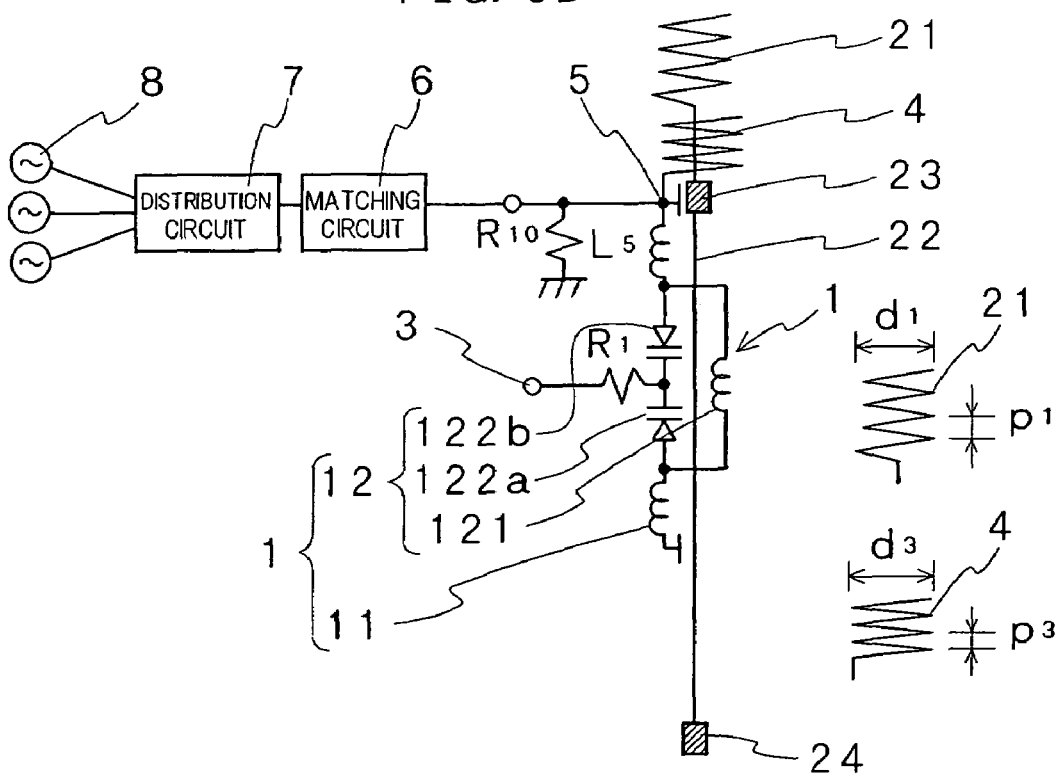

FIGS. 5A and 5B show a configuration of an antenna using the variable tuning antenna with which, for example, a digital TV band and a cellular communication band can be transmitted and received by a portable telephone. The antenna shown in FIG. 5A and 5B has such a structure that, like in a conventional portable telephone, it operates as a variable tuning antenna when an antenna is extended out from the casing (not shown in FIG.), and that it operates as a fixed antenna, switched off the variable tuning antenna, for a portable telephone band or others when the antenna is switched off and a part of the antenna is retracted to the casing. FIG. 5A is an explanatory figure of the antenna extended out of the casing and FIG. 5B is that of the antenna retracted to the casing. And in the example shown in FIGS. 5A and 5B, in addition to the variable tuning antenna, a third antenna element 4 is provided on the outside of the casing for a portable telephone. The third antenna element 4 can be used independently whether the antenna described above is extended or retracted. Additionally, since the tuning circuit 1 connected to the connection part 5 has set to be high impedance, the variable capacitance element 122 (122A and 122B) does not affect tuning by the third antenna element 4.

In this example, the radiation element 2 has a structure in which one end of the first antenna element 21 and that of the second antenna element 22 are electrically connected at a first connecting part 23 and the part of the second antenna element 22 is movable for being extended out of the casing and retracted to the casing. And when the second antenna element 22 is extended out of the casing, as shown in FIG. 5A, the other end of the second antenna element 22 is connected to one end of the first inductance 11 of the tuning circuit 1 at the second connecting part 24 (an example shown in FIG. 5A is of DC connection), and the other end of the tuning circuit (a end of a matching inductance $L_5$) is connected to the feeding part, through the connecting part 5 followed by the matching circuit 6 and the distribution circuit 7. And an adjustment of a tuning frequency can be obtained by the variable capacitance element 122.

And when the second antenna element 22 is retracted to the casing, as shown in FIG. 5B, the second connection part 24 of the second antenna element 22 is disconnected from the tuning circuit 1, then it does not operate as the variable tuning antenna, and the first connection part 23 is electrically connected to the connection part 5 which leads to a feeding part (an example shown in FIG. 5B is AC connection). As the tuning circuit 1 connected to the connection part 5 is of high impedance against the first antenna element 21, the variable capacitance element 122 does not affect the tuning by the first antenna 21. And, although the second antenna element 22 is retracted to the casing, the first antenna element 21 is located outside of the casing, then the first antenna element 21 can operate as an antenna by itself.

The first and third antenna elements 21 and 4 are not always need to be outside of the casing, and if material of the casing transmits radio waves, it is allowed to be set in the casing. In short, it is expected that, when the second antenna element 22 is retracted to the casing, the first antenna element 21 operates as an independent antenna and that the third antenna element 4 is connected to operate as an antenna by itself whether the second antenna element 22 is retracted to the casing or not.

The first antenna element 21, shown in FIGS. 5A and 5B, is an element of a coiled structure but a structure of the antenna element is not limited to this example and a folded element formed on a surface of an insulating substrate or a meander shaped element formed on an outer surface of an insulating pipe can be used. An electrical length of the first antenna element 21 can be set according to an objective frequency transmitted and received when the second antenna element 22 is retracted to a casing. For example, by setting an electrical length of the first antenna element 21 to a ¼ wave length or its odd multiples of a frequency band according to a use for a portable telephone, GPS or the Bluetooth, transmitting and receiving of the frequencies can be obtained.

The second antenna element 22 is formed so as to cooperate with the first antenna element 21 by being extended out of the casing, and also its length is set to an appropriate electric length of, for example, ¼ wave length or the odd multiples of that at a center frequency (620 MHz) of a digital TV band in order to get a resonance in the frequency band. Although it is preferable that a resonance frequency by the first and second antenna elements 21 and 22 is adjusted so as to resonate at a center frequency of a desired frequency band to get a tuning certainly and easily in a desired frequency band, the resonance frequency of the radiation element 2 itself is not limited to such a center frequency as long as a tuning can be obtained in a whole range of a desired frequency band. A structure of a whip antenna is preferable for the second antenna element 22 because it can be retracted to the casing or extended out from the case, but an antenna of a small wound coil which extends linearly can be used in stead of a rigid linear antenna.

In an example shown in FIGS. 5A and 5B, the third antenna element 4 is formed in a coil structure for use of, for example, a portable telephone in order to transmit and receive its frequency band. During watching a digital TV by a portable telephone or the like, occasional needs to have a communication on a portable telephone simultaneously occur, even in such case of the simultaneous usage, both services of a digital TV and a portable telephone can be received at the same time by the variable tuning antenna with the extended second antenna element 22. As the distribution circuit 7 is provided between the variable tuning circuit and the feeding part 8, as shown in a block figure in FIGS. 5A and 5B, these two signals are sent separately to the feeding parts of the respective frequencies through a divider and a filter.

As described above, although the first antenna element 21 can be formed so as to be used for a portable telephone, the first antenna element can not be used independently when it is used as a variable tuning antenna, for example, for a digital TV reception, but even in this case the both signals for portable telephone and digital TV can be transmitted and received simultaneously by using the third antenna element 4. In this case, by setting the first antenna element 21 so as to resonate at a frequency band of a portable telephone and a phase so as to match to that of the third antenna element 4, the first and the third antenna elements can transmit and receive signals of a portable telephone and additionally operate with an increased sensitivity when the variable tuning antenna does not operate, in other words when the second antenna element 22 is retracted to the casing.

Alternatively, by setting the first antenna element 21 to a different frequency band from that of a portable telephone, for example, that of GPS or the Bluetooth, when a digital TV is not in use, it can be used for GPS or the Bluetooth, and signals of three frequency bands can be transmitted and received by the same structure of an antenna for a conventional portable telephone. In processing these three frequency bands, a signal of each frequency band is distributed to the feeding part 8 through the distributing circuit 7 described above and each frequency band can be transmitted and received by signal processing through a transmitting/receiving circuit not shown in FIGS.

In a concrete example, the first and third antenna elements 21 and 4 are set so as to resonate at a frequency of 1.5 GHz for a PDC (personal digital cellular communication) and the first antenna element 21, a second antenna element 22 and the variable tuning circuit 1 which are set so as to serve as an antenna for a digital TV are mounted in a portable telephone. Here, each element is formed with a structure and dimensions described below: the first antenna element 21 is made of a helical coil of an outer diameter $d_1$ 4 mm, a pitch $p_1$ 10 mm, a wire diameter 0.5 mm and a physical length $M_1$ 25 mm and an electrical length ¼ wave length of 1,465 MHz; the second antenna element 22 is made of a wire of a diameter 0.7 mm, a physical length of $M_1+M_2$ 100 mm and an electrical length ¼ wave length of 620 MHz; and the third antenna element is made of a coil of an outer diameter 7 mm, a pitch $p_3$ 1.8 mm, a wire diameter 0.5 mm, a physical length $M_3$ 5 mm, and an electrical length ¼ wave length of 1,465 MHz.

And the first inductance element 11 of 47 nH, the second inductance element 121 of 33 nH, the inductor $L_5$ for matching of 3.3 nH, R1 and R2 of equally 10 kΩ and the variable capacitance diodes 122a and 122b of from 2.5 pF to 15 pF in from 0 to 3 V are used. As a result, by a portable telephone, a tuning can be obtained in a whole range of a digital TV band and also a communication by a PDC is normally performed.

In the example described above, a band of 1.5 GHz for a PDC is set for a cellular communication, but in a case that a band of 800 MHz for PDC, a band for PHS and a band of W-CDMA are set, two frequency bands of one of these and a band for a digital TV can be processed. And in the example described above, both of the first and third antenna elements 21 and 4 are set to a band of 1.5 GHz, by setting the first antenna element 21 to a band of GPS or the Bluetooth, processing three frequencies can be also obtained.

As explained above, by the present invention, as the variable tuning antenna of a wide band and an antenna for a portable telephone can be used at the same time such that, for example, transmitting/receiving by a portable telephone can be achieved while observing a digital TV by a portable telephone, and a sensitivity of a portable telephone can be increased or other frequency bands such as GPS or the Bluetooth can be used when a digital TV is not in use, a usage of a portable wireless device becomes much more diverse.

In the example described above, a connection of the first antenna element 21 and the second antenna element 22 and the connection of the second antenna element 22 and the tuning circuit 1 are a DC connection which is connected directly, and only a connection of the first antenna element 21 to the feeding part 8 is a AC connection which is connected through the capacitance or the inductance, but these ways of connections can be applied arbitrary.

And in the example shown in FIGS. 5A and 5B, parts following to the feeding part 8 are not shown in the figure, but in a portable wireless device, a transmitting/receiving circuit such as a signal process circuit processing signals transmitted and received by these antennas is mounted and connected to the feeding part 8. As these circuits are same as those of conventional wireless devices, an explanation is omitted. Additionally, in FIGS. 5A and 5B, the matching circuit 6 is a circuit to match an impedance of an antenna side and a side of the feeding part 8, the distribution circuit 7 includes dividers and filters to divide signals to each frequency band to be sent to a desired circuit, when the antenna is a type of transmitting and receiving plural frequency bands.

According to the present invention, a digital TV can be observed easily by a portable wireless device such as a portable telephone, because tuning in a whole range can be possible by a simple variable capacitance element even in a frequency band of very wide and low band like that of a digital TV.

Furthermore, by a portable wireless device according to the present invention, a portable telephone service can be received while watching a digital TV, because a variable tuning antenna for wide band and an antenna for a wireless device are mounted in it. And, a portable wireless device for multi use can be obtained, in which transmitting and receiving of a third frequency band is possible, thereby satisfying recent increasing claims of multiple band and wide band to a portable wireless device.

INDUSTRIAL APPLICABILITY

The present invention is effective to realize a multiuse antenna and a portable wireless device satisfying recent increasing claims for a multi-band service and a wide-band which can receive a digital TV or the like beside transmitting and receiving of a cellular communication or the like.

What is claimed is:

1. A variable tuning antenna comprising:
   a radiation element; and
   a tuning circuit connected to the radiation element in series, the tuning circuit comprising
      a first inductance element and
      a parallel circuit which is connected to the first inductance element in series, the parallel circuit comprising
         a second inductance element and
         a variable capacitance element connected to each other in parallel,
   wherein the tuning circuit is formed so as to be tunable in the desired frequency band by varying the capacitance of the variable capacitance element, and
   the tuning circuit is set so that a combined reactance of the radiation element and the first inductance element and a combined reactance of the parallel circuit are canceled by each other, and
   the parallel circuit does not resonate in a desired receiving frequency band,
   and wherein
   the radiation element comprises a first antenna element and a second antenna element connected to each other electrically in series,
   one end of the second antenna element that is opposite to the first antenna element being connected to a feeding part through the tuning circuit, the first antenna element and the second antenna element being formed in an electric length so as to resonate at a frequency within the desired frequency band by the total length, and so as to resonate at a first frequency band of a wide band in the desired frequency band with the tuning circuit, and
   a connecting part of the first antenna element and the second antenna element being directly connected to the feeding part without the tuning circuit, so as to resonate at a second frequency band, which is different from the first frequency band, and to be non-resonant in the first frequency band, by only the first antenna element.

2. The variable tuning antenna according to claim 1, wherein the variable capacitance element comprises two variable capacitance diodes, the two variable capacitance diodes being connected in series in reverse polarity, and having a terminal of a control voltage connected to a connecting part of the two variable capacitance diodes.

3. The antenna according to claim 1, wherein the first frequency band is a frequency band of a digital TV.

4. A portable wireless device comprising:
   a transmitting/receiving circuit;
   a casing surrounding the transmitting/receiving circuit;
   a feeding part located near to the casing and connected to the transmitting/receiving circuit electrically;
   the variable tuning antenna according to claim 1, connected to the feeding part; and
   a third antenna element connected to the feeding part,
   wherein the third antenna element comprises an antenna resonating at a third frequency band different from that of the variable tuning antenna,
   so that two frequency bands of the first frequency band of a wide band obtained by the variable tuning antenna and the third frequency band can be transmitted and received.

5. The portable wireless device according to claim 4, wherein the second antenna element of the radiation element is formed to be extended out of the casing and retracted into the casing, and a first end of the tuning circuit is connected to the feeding part; and
   wherein
   when the second antenna element is extended out of the casing, the second antenna element is connected to the feeding part through a second end of the tuning circuit opposing the first end to resonate at the first frequency band and
   when the second antenna element is retracted into the casing, the first antenna element is connected to the feeding part directly.

6. The portable wireless device according to claim 5, wherein
   the first antenna element and the third antenna element are formed in an electrical length so as to resonate at the same frequency band and
   the first antenna element and the third antenna element are adjusted so as to strengthen radio waves transmitted and received in phase with each other.

* * * * *